United States Patent Office 3,408,644
Patented Oct. 29, 1968

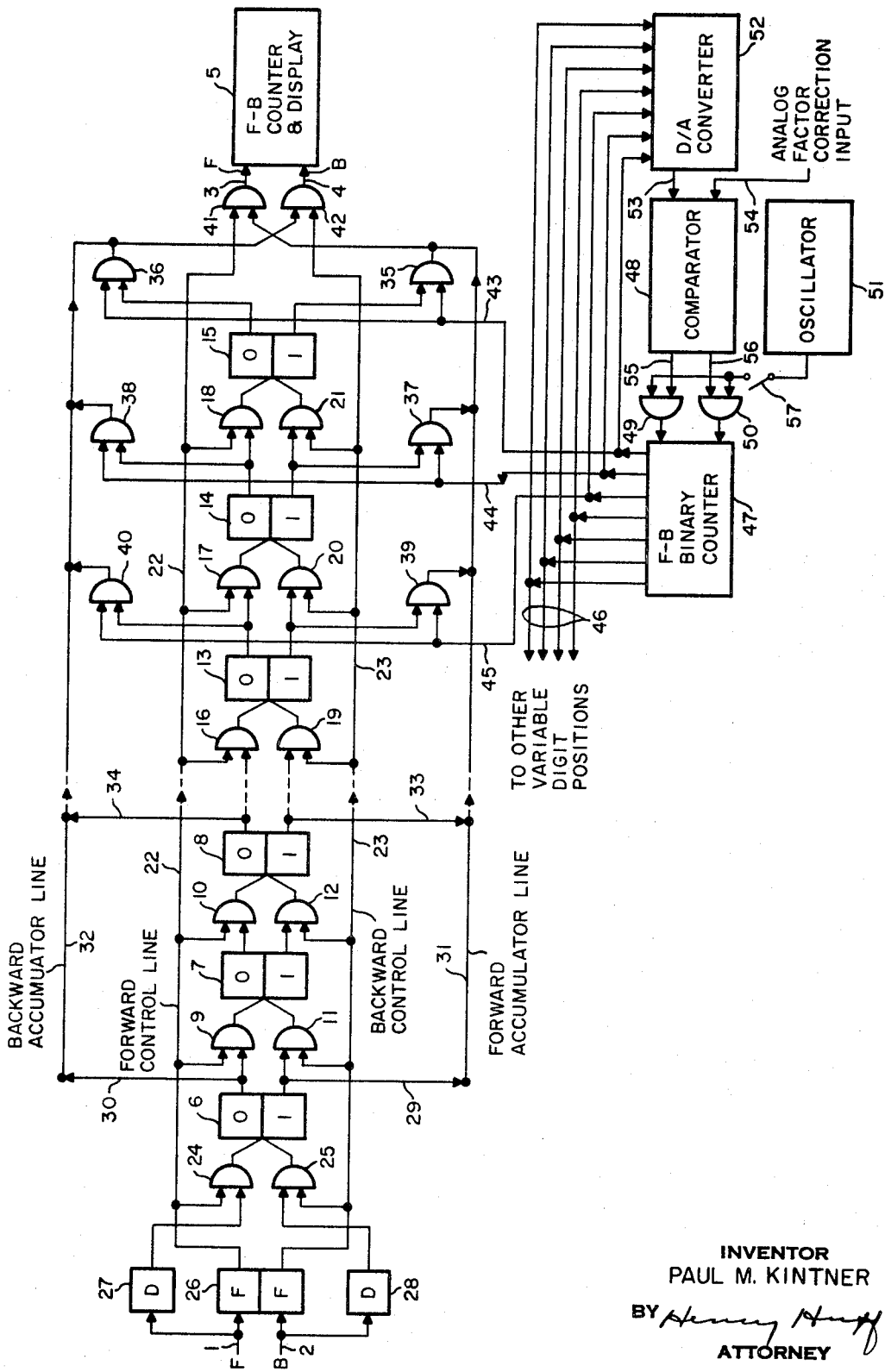

3,408,644
PULSE COUNT CONVERSION SYSTEM
Paul Marvin Kintner, Huntington Station, N.Y., assignor to Cutler-Hammer, Inc., Milwaukee, Wis., a corporation of Delaware
Filed Feb. 12, 1965, Ser. No. 432,219
6 Claims. (Cl. 340—347)

This invention relates to improvements in pulse count conversion devices, and particularly to pulse rate multipliers that are reversible, i.e. operable in either a forward counting or a backward counting mode. A pulse rate multiplier is a device that accepts a train of input pulses and produces an output train of a different, generally smaller, number of pulses. This is done by rejecting some of the input pulses on a systematic basis, and selecting the remaining pulses as the output train.

The conversion factor, or ratio of the number of output pulses to the number of input pulses, depends upon the way the pulse are selected. Thus, if the device is arranged or adjusted to pass every $n$th pulse, the factor is $1/n$. If it passes every $n$th pulse and every $m$th pulse, the factor is $1/n+1/m$. Any desired conversion factor between zero and one can be approached in this manner to any desired accuracy by selection from a sufficient number of input pulses. Usually the selection is made on the basis of powers of two, as in the binary rate multiplier described on pages 29–05 to 29–08 of Handbook of Automatic Computation and Control, volume 2, published 1959 by John Wiley and Sons, Inc., New York, N.Y.

Pulse rate multipliers of the above type will operate only with pulse trains representing monotonically increasing numbers, and are not reversible. Thus, if it is desired to represent a number that is less than some number previously represented, the device must be reset and then brought back up to the desired smaller number.

Thre is a special need for reversible pulse rate multipliers, for example in distance or displacement measuring systems of the fringe counting optical interferometer type. The interference fringes appear as variations in light intensity, each complete cycle of variation representing a motion of about six millionths of an inch, the exact figure depending upon the wavelength of light that is used. The fringes are detected photoelectrically to produce electrical pulses which are counted by a high-speed electronic counter.

Since motion can occur in either direction, toward or away from the starting point, the counter is designed to count forward or backward and its direction of counting is controlled by means that senses the direction of motion. The directional sensing and control means is designed to act substantially instantaneously, to avoid loss of counts or false accumulations of counts owing to unavoidable vibration of the interferometer parts. The counter operates to keep a running tally of the net fringe count during the motion whose length is to be measured, for example the traverse motion of a machine tool part, and displays the counted number, which represents the motion in units of wavelengths of light.

For most purposes, the displayed number must be converted to more practical units, such as decimal inches or centimeters. This can be done by reference to a prepared conversion table. Conversion in this manner is slow, subject to human error, and additionally complicated by the fact that the wavelength of light varies with atmospheric pressure.

The desired conversion could be effected in more or less obvious manner by conventional digital computer means, since it involves only simple arithmetic operations. However, even the fastest digital computer requires an appreciable time to multiply two many-digit numbers, and therefore could not operate in real time, i.e. it would have to be made to calculate the total on command, as at the end of a traverse. Moreover, even the simplest digital computer capable of the required operations is complex and expensive.

The principal object of this invention is to provide count conversion devices of the pulse rate multiplier type that are capable of forward-backward operation of high speed forward-backward electronic counters.

A more specific object is to provide reversible count conversion devices that are particularly adaptable for use with systems such as gaging interferometers, in which motional displacements are measured in terms of pulse counts.

Another object is to provide count conversion systems of the above type incorporating means for correcting a nearly constant conversion factor to compensate variations such as those resulting from changes in ambient conditions, for example barometric pressure.

In the practice of the present invention, the foregoing objects are achieved by providing a multi-stage reversible binary counter with separate forward and backward count accumulator lines, each coupled to appropriate points in the counter in accordance with the required conversion factor, and each having an output gate connected to be enabled by the respective counting direction control means. For applications requiring adjustment or correction of the conversion factor, higher order stages of the counter (corresponding to lower order digits of the conversion factor) are coupled to the accumulator lines by switch means or gates arranged to be set by a binary register carrying a digital representation of the required correction.

The invention will be described with reference to the accompanying drawing, which shows a schematic block diagram of a preferred embodiment.

In the drawing, input lines 1 and 2 are adapted to receive forward counting pulses and backward counting pulses respectively, for example from a gaging interferometer system of the type described in U.S. patent application, Ser. No. 405,494, filed Oct. 21, 1964 in the name of C. J. Hubbard and entitled "Gauging Interferometer Systems." Forward and backward pulse output terminals 3 and 4 are connected to the respective inputs of a reversible accumulator counter 5, which is provided with display or readout means preferably arranged to indicate decimal numbers. The remainder of the apparatus represented in the drawing is the count conversion system.

A series of bistable circuits 6, 7, and 8 are cascade coupled through forward gates 9, 10 and backward gates 11, 12 in known manner to form the initial stages of a reversible or forward-backward binary counter, which may consist of any desired total number of such stages, similarly cascaded. The last three stages, comprising bistable circuits 13, 14 and 15 and their associated gates 16 through 21, are also illustrated. The number of stages is made equal to the desired number of significant binary digits in the conversion factor. For use with the gaging interferometer described in the above mentioned Hubbard application, Ser. No. 405,494, an appropriate number of binary stages is twenty, to accommodate 20 significant binary digits, providing a precision of one part in $2^{20}$, or approximately one part per million.

For this explanation it is assumed that the bistable circuits are of a type that changes from either stable state to the other in response to a positive-going input pulse, but does not respond to a negative-going pulse. It is also assumed that each change in state produces a positive-going pulse at one of the output terminals, corresponding to the state to which the circuit changes. Thus, in the drawing, the upper part of each bistable circuit is denoted 0 and the lower part 1. When a circuit changes from its 1 state to its 0 state, a positive pulse appears at its upper output terminal. When the change is from 0 to 1, a positive pulse appears at the lower output terminal.

The foregoing characteristics are typical of certain designs of bistable circuits that are well known, and need not be described here in detail. The circuits include differentiating networks for pulse forming, and may if necessary include rectifier diodes arranged to eliminate pulses of undesired polarity. It is to be understood that other known types of bistable circuits, operating with negative-going pulses for example, could be substituted.

The gates 9 through 12, 16 through 21, and all other similarly represented gates may be of the "and" or "coincidence" type. Each has two input terminals and an output terminal, and is designed in known manner to either block a pulse applied to one of its input terminals, or conduct the pulse to the output terminal, depending upon the value of a control signal applied to the other input terminal. In this example, the gates will block when the control signal is of a certain negative potential with respect to some reference such as ground, and conduct when the control signal is at the reference potential, e.g. ground.

Gates such as 9, 10, 16, 17 and 18 coupling the output of the 0 side of a bistable circuit to the input of the succeeding one are the "forward" gates. The control input terminals of all the forward gates are connected to a forward control line 22. Gates 11, 12, 19, etc. are the "backward" gates, and are similarly connected to a backward control line 23. The first stage of the binary counter also includes a forward gate 24 and a backward gate 25, preceding the bistable circuit 6.

The control lines 22 and 23 are connected to respective output terminals of a "flip flop" circuit 26, which may be substantially identical to the bistable circuits 6, 7, etc. except that means for differentiating the output signals is omitted, and the upper and lower, or 0 and 1, sides have separate input terminals which are connected to the forward and backward input lines 1 and 2 respectively. The input lines 1 and 2 are also connected through delay circuits 27 and 28 to the signal input terminals of the first forward and backward gates 24 and 25 respectively. The delay circuits are designed to delay the application of an input pulse to the first gate 24 or 25 until the flip flop 26 has had time to change from one state to the other.

For the purpose of this explanation, it is assumed that the desired conversion factor is between 0.625 and 0.750, i.e. it is at least five eighths, but less than three quarters. Expressed in binary form, the conversion factor is 0.101 . . . , which means one half, plus one eighth plus a series of other, presently unspecified negative powers of 2. The first three significant binary digits following the binary point are 1, 0 and 1, in descending order of significance.

The first and most significant digit, 1, is accommodated by the connections 29 and 30 of the 1 and 0 output terminals of the first binary stage 6 to forward and backward accumulator lines 31 and 32, respectively. The third digit, also a 1, is represented by connections 33 and 34 of the outputs of the third stage 8 to the accumulator lines 31 and 32. In the case of the second stage 7, where the corresponding binary digit of the conversion factor is 0, no connections are made to the accumulator lines.

Subsequent fixed-value binary digits of the conversion factor are similarly "wired in" by connecting or not connecting the outputs of the respective binary stages, not shown, to the accumulator lines, depending upon whether the particular digit is 1 or 0. Lines 31 and 32 are coupled through gates 41 and 42 respectively and terminals 3 and 4 to the forward and backward input terminals of the accumulator counter 5. The control input terminals of gates 41 and 42 are connected to the corresponding control lines 22 and 23.

The 1 and 0 output terminals of the final binary stage 15 are coupled to the forward and backward accumulator lines 31 and 32 through gates 35 and 36 respectively. The immediately preceding stages 14 and 13 are similarly coupled to lines 31 and 32 through gates 37, 38 and 39, 40, as shown. Several earlier preceding stages, not shown, may also be coupled through gates in the same manner, as required. This arrangement enables the last few, least significant, binary digits of the conversion factor to be changed for introducing a relatively small correction in the conversion factor.

The control input terminals of each pair of gates, such as 35 and 36, coupling a variable digit stage such as 15 to the accumulator lines, are connected together as shown to a respective digit control line such as 43. Two other digit control lines 44 and 45, associated with variable digit stages 14 and 13 respectively, are shown. Other digit control lines for preceding variable digit stages, not shown, are indicated generally by the reference numeral 46.

The digit control lines 43-46 may be connected to any suitable means for applying control voltages to them in accordance with the values of the respective digits of the conversion factor. Such means could, for instance, consist merely of a bank of key-operated switches and a D-C source. However, in applications such as use with the above mentioned type of fringe-counting interferometer systems, it may be preferred to provide means as described later for introducing the conversion factor corrections automatically.

Suppose the nominal value of the desired conversion factor, expressed as a decimal, to be 0.637258. The equivalent binary number, expressed to substantially the same degree of precision, is 0.10100011001000110101. Specifically, the six significant decimal digits express the factor to one part per million, and the twenty significant binary digits express it to one part in $2^{20}$, or one part per 1,048,576. Accordingly, the conversion system comprises a total of twenty stages 6, 7, 8 . . . 13, 14, 15, each representing a respective one of the binary digits. The first, third, seventh, eighth, eleventh, fifteenth, sixteenth, eighteenth and twentieth stages are coupled to the accumulator lines 31 and 32, and all other stages are not.

In the operation of the system as thus far described, with an interferometer system of the aforementioned type for example, input pulses may be presented to either the forward input line 1 or the backward input line 2, but not to both simultaneously. Each pulse on the forward line represents a unit, i.e. one quarter wavelength of light, increase in distance between a movable element and a reference point, and each pulse on the backward line represents a unit decrease in said distance. The pulse repetition rate depends upon the speed of the motion, and may be anywhere between zero and, say 600,000 p.p.s.

Assuming first that the distance is increasing monotonically, a train of pulses appears on the input line 1. The first such pulse sets the flip flop 26, unless it is already so set, to place a negative potential on the backward control line 23 and ground potential on the forward control line. This sets the interstage gates such as 9-12 and 16-21 for forward counting operation of the binary chain, and also makes forward gates 24 and 41 conductive and backward gates 25 and 42 non-conductive.

The first pulse, reaching the first binary stage 6 by way of delay 27 and gate 24, causes that stage to change from its initial state, 0 or 1, to the other state, 1 or 0. The change results in a positive going output pulse from the 1 side if the initial state was 0, or from the 0 side if the initial state was 1. In either case, the succession of forward input pulses will produce positive going output pulses alternately at the 0 and 1 output terminals; every other input pulse provides a pulse on the forward accumulator line 31 by way of connection 29, and each alternate intervening pulse provides a pulse on the backward accumulator line 32 by way of connection 30.

The pulses on the forward accumulator line 31 are conducted by the forward gate 41 to the accumulator counter 5. Those on the backward accumulator line 32 are blocked by the backward gate 42. Thus the first binary stage 6 rejects exactly one half the input pulses and passes the remaining half to the accumulator counter. The rejected pulses, however, are conducted by the forward interstage gate 9 to the second binary stage 7. None of these pulses is passed to the accumulator, because neither line 31 or 32 is connected to the second stage. Half of them are passed by the forward interstage gate 10 to the third binary stage 8.

Stage 8 again rejects half of the pulses reaching it, and, like the first stage, directs the remaining half to the accumulator counter. The rejected pulses, as before, go through a forward interstage gate to the following stage, not shown. Thus the first three stages operate to pass $\frac{1}{2} + \frac{1}{8}$, or $\frac{5}{8}$ of the input pulses to the accumulator counter 5.

Subsequent stages operate similarly, each receiving half as many input pulses as the preceding stage, and passing half or none of the received pulses to the accumulator. With the described connections to the accumulator lines, the total number of pulses passed to the accumulator will never differ from the product of the conversion factor 0.637258 times the total number of input pulses by more than one pulse count or one part per $2^{20}$, whichever is greater. To illustrate, a total of eight input pulses will produce five output pulses; a total of 1,000 input pulses will produce 637 output pulses; 1,000,000 input pulses will produce 637,258 output pulses. In each case, the number of output pulses is within one unit of 0.637258 times the number of input pulses. A total of several million input pulses could produce a total number of output pulses that differs from the correct number by several units, but never by more than one part in $2^{20}$.

Accumulation of the converted count in the accumulator-counter 5 continues as long as successive pulses are applied to the forward input line 1, and no pulses are applied to the backward input line 2. If all input pulses are stopped, the accumulator 5 will stand at its current count until it is reset, or further pulses are received. In practical operation as with a gaging interferometer such a completely static situation rarely occurs because the movable gaging element, even when nominally stationary, is nearly always in motion as a result of normal ambient vibration. The vibratory motion may extend over a range corresponding to several, or many, fringe counts, resulting in brief random bursts of forward and backward pulses at the input lines 1 and 2.

The first backward pulse resets the flip flop 26, making all the forward gates nonconductive and all the backward gates conductive. It also goes to the first binary stage 6 by way of delay 28 and gate 25. Operation with this and successive following backward pulses is similar to the above described forward mode, except that the interstage transfer pulses are obtained from the 1 sides of the binary stages and the accumulator pulses are obtained from the 0 sides of the selected binary stages, and are applied to the backward input 4 of counter 5 by way of line 32 and gate 42.

The number of pulses produced on backward output lead 4 is related to the number of pulses applied to backward input lead 2 in the same way as the numbers of forward pulses on leads 3 and 1 are related, discussed above. Thus a series of eight backward input pulses on lead 2 will produce five pulses on lead 4, operating the accumulator 5 to subtract five from the count previously standing in it; a series of 1000 pulses on lead 2 will subtract 637 from the accumulator count, and so on.

The random bursts mentioned above are counted substantially instantaneously as they occur, each variation being followed up or down as the case may be. Thus the total count will always be within one pulse or one part per million, whichever is greater, of the correct value. The display means associated with the accumulator counter 5 may be made sufficiently sluggish, as by use of incandescent lamps or electromechanical indicator elements, to be unable to follow rapid count variations. In this case, the display will integrate out the meaningless high frequency fluctuations and show the short-term average count. This is desirable in the gaging interferometer application, because it tends to give the indication that would be shown in the absence of vibration.

To provide automatic correction of the conversion factor, the currently required values of the last few, say seven, binary digits of the conversion factor are stored in a register, which may be a reversible binary counter 47. The register-counter 47 comprises a series of bistable circuits cascaded through forward and backward gates like the previously described circuits 6, 7, 8 etc.

It may be assumed that there is a point in each bistable circuit where the potential is negative when the circuit is in its 0 state, and zero, i.e. reference or ground, when the circuit is in its 1 state. If such output points are not inherent in the particular design of the bistable circuits, they may be provided in obvious manner by relays or other switching means connected to be controlled by the respective bistable circuits. The output point of the least significant digit stage of the counter register 47 is connected to the digit control line 43; the output points of following stages are connected in ascending digital order to digit control lines 44, 45 and 46.

If the conversion factor correction information were presented in digital or pulse-count form, it could be applied directly in appropriate manner to the counter-register 47. In the present example, the correction input is an analog signal such as a voltage produced by an electro-mechanical sensor and representing barometric pressure, for example. In this case the counter-register 47 forms part of an analog to digital converter, which also includes a comparator 48, gates 49 and 50, a pulse oscillator 51, and a digital to analog converter 52.

The digital to analog converter 52 is of suitable known type adapted to accept digital input in parallel form, i.e. by way of a plurality of input points, each connected to a respective output point of the counter-register 47, and to produce an analog output signal on lead 53, as a voltage of a magnitude that corresponds to the number currently stored in binary digital form in the counter-register 47. One such type of digital to analog converter is a voltage divider formed of series connected resistors of binary weighted values. Each resistor is shunted by the normally closed contacts of a respective relay arranged to be energized by the presence of a binary 1 in the corresponding stage of register-counter 47.

The comparator 48 is any suitable known type of device adapted to receive the analog output of converter 52 on lead 53 and the analog correction signal input on lead 54, and produce a gate control output upon one or the other of its output leads 55 and 56, depending upon which input is greater. The comparator 48 may be simply a voltage source and a differential relay, for example. Assuming a gate-enabling output to appear on lead 55 when the input on lead 53 is greater, and on lead 56 when the input on lead 54 is greater, the leads 55 and 56 are connected to the control input terminals of gates 49 and 50, at the forward and backward input terminals respectively of the counter 47.

The signal input terminals of gates 49 and 50 are connected through a switch 57 to the pulse oscillator 51. The oscillator 51 produces pulses continuously at any convenient repetition rate within the count rate capability of the counter 47.

For simplicity of explanation, it is assumed initially that the conversion factor is required to vary in direct proportion to the variation of the voltage on the input lead 54, i.e. when said voltage is zero, the last seven binary digits of the conversion factor should be zero; when it is at its maximum allowable value, the last seven digits are all 1. Since the nominal value of the conversion factor has been assumed as binary 0.10100011001000110101, corresponding to decimal 0.637258, this means that the factor is to be varied within the range 0.10100011001000000000 (decimal 0.637207) to 0.10100011001001111111 (decimal 0.637326).

The switch 57 may be normally open as shown, and be closed momentarily when the conversion factor is to be corrected, for example just before beginning a measurement traverse. When the switch is closed, the pulse output of oscillator 51 goes to the signal inputs of both the forward and backward gates 49 and 50.

If the voltage on the output lead 53 of the digital to analog converter 52 differs from that on lead 54 by more than a small threshold amount, the comparator 48 energizes the appropriate one of its output leads 55 and 56, operating the respective gate 49 or 50 to conduct pulses to the forward or backward input terminal of the register-counter 47. These pulses add to or substract from the count in the register, as required, to make the count correspond to the voltage on lead 54. When such correspondence is reached, both gates 49 and 50 are cut off and the control leads 43-46 remain energized in the pattern providing the required values of the respective conversion factor digits.

The scale factor or proportionality constant between the change in the conversion factor and the change in a condition, e.g. barometric pressure, that requires the factor to be changed, is accounted for in known manner by design of the condition sensor and the digital to analog converter 52. If for some reason such a design convenience the correction is inversely, rather than directly related to the analog input on lead 54, the feedback connections to the converter 52 may be made from the other sides of the binary stages of the counter-register 47, providing a complementary relationship between the analog input and the count in the register.

I claim:

1. A count conversion device, comprising:
   (a) a reversible binary counter including a series of bistable stages each adapted to change from either stable state to the other in response to an input pulse, each having first and second output terminals and means to provide an output pulse at one of said terminals upon change of state in one sense and at the other of said terminals upon change of state in the other sense, and counting direction control means adapted to couple the first output terminal of each stage as an input to the succeeding stage for counting in one direction, and to couple the second output terminal of each stage as an input to the succeeding stage for counting in the other direction,
   (b) two main output terminals,
   (c) means for coupling a selected group of said counter stage first output terminals to one of said main output terminals and for coupling a corresponding group of said counter stage second output terminals to the other of said main output terminals, and
   (d) means responsive to said counting direction control means for selectively disabling the coupling of one of said groups to the respective main output terminal.

2. The invention set forth in claim 1, wherein said means for coupling selected groups of said counter stage output terminals to said main output terminals includes respective accumulator lines and means coupling selected individual counter output terminals to said respective accumulator lines, and said means responsive to said counting direction control means for selectively disabling the coupling of one of said groups to the respective main output terminal comprises gate means between said accumulator lines and the respective main output terminals.

3. The invention set forth in claim 2, wherein said means coupling selected individual counter output terminals to said respective accumulator lines are permanent or "wired in" to the counter stages of order $\leq m$, in accordance with the binary values of the $m$ most significant digits of the input-output conversion factor of the device, and are conditional to the counter stages of order $>m$ and $\leq n$, wherein $n$ is the total number of counter stages and the couplings to stages of orders $m+1$ through $n$ represent successively less significant binary digits of said conversion factor, said less significant digits being subject to variation.

4. The invention set forth in claim 3, wherein said conditional coupling means comprise respective switch means, further including means for operating said switch means in response to a condition that affects the required value of said conversion factor.

5. The invention set forth in cliam 4, wherein said switch means are gate devices and said means for operating said switch means is a binary register.

6. The invention set forth in claim 5, further including an analog to digital converter for converting an analog representation of said condition to digital form, wherein said binary register is a component of said analog to digital converter.

References Cited
UNITED STATES PATENTS

| | | | |
|---|---|---|---|
| 2,999,207 | 9/1961 | Quynn | 328—44 |
| 3,041,476 | 6/1962 | Parker | 328—42 |

MAYNARD R. WILBUR, *Primary Examiner.*

J. GLASSMAN, *Assistant Examiner.*